United States Patent
Moon et al.

(10) Patent No.: US 10,211,760 B2
(45) Date of Patent: Feb. 19, 2019

(54) PIEZOELECTRIC ULTRASONIC MOTOR AND OPERATION METHOD OF THE SAME

(71) Applicant: Samsung Electronics Co., Ltd, Gyeonggi-do (KR)

(72) Inventors: Chan-young Moon, Gyeonggi-do (KR); Jin-young Bang, Gyeonggi-do (KR); Jin-heon Oh, Gyeonggi-do (KR); Jong-hyeok Chun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 15/154,847

(22) Filed: May 13, 2016

(65) Prior Publication Data
US 2016/0336876 A1    Nov. 17, 2016

(30) Foreign Application Priority Data
May 15, 2015   (KR) .................. 10-2015-0068186

(51) Int. Cl.
*H01L 41/09* (2006.01)
*H02N 2/10* (2006.01)
*H02N 2/16* (2006.01)
*H02N 2/14* (2006.01)

(52) U.S. Cl.
CPC ............. *H02N 2/163* (2013.01); *H02N 2/142* (2013.01)

(58) Field of Classification Search
CPC .............................. H02N 2/142; H02N 2/163
USPC .... 310/317, 323.01, 323.02, 323.03, 323.05, 310/323.06, 323.117, 323.18, 328
See application file for complete search history.

(56) References Cited

U.S. PATENT DOCUMENTS

| 4,513,219 | A |   | 4/1985 | Katsuma et al. |
| 4,829,209 | A | * | 5/1989 | Kawasaki ............ H02N 2/166 310/317 |
| 4,831,305 | A | * | 5/1989 | Mukohjima .......... H02N 2/163 310/323.06 |
| 5,008,581 | A | * | 4/1991 | Kumada ............... H02N 2/002 310/323.02 |
| 5,043,621 | A | * | 8/1991 | Culp .................. H01L 41/0913 310/316.02 |
| 5,247,221 | A |   | 9/1993 | Atsuta |
| 5,821,667 | A | * | 10/1998 | Takagi ................. H02N 2/004 310/317 |

(Continued)

FOREIGN PATENT DOCUMENTS

| JP | 63-89076 A | * | 4/1988 | ............. H02N 2/00 |
| JP | 63-89077 A | * | 4/1988 | ............. H02N 2/00 |

*Primary Examiner* — Thomas Dougherty (57) ABSTRACT

A piezoelectric ultrasonic motor includes: a drive piezoelectric material wherein a plurality of piezoelectric elements, which are polarized by opposite polarities along a circumferential direction around a rotation shaft, are alternately arranged, and a vibration-control piezoelectric material wherein a plurality of piezoelectric elements, which are arranged along a circumferential direction around the rotation shaft and polarized by opposite polarities, are arranged to correspond to the plurality of piezoelectric elements of the drive piezoelectric material, wherein AC power and another AC power having a phase difference with respect to the AC power are respectively applied to the piezoelectric material and the vibration-control piezoelectric material, in a vibration damping area of the drive piezoelectric material.

17 Claims, 8 Drawing Sheets

(56) References Cited

U.S. PATENT DOCUMENTS

| | | | |
|---|---|---|---|
| 6,518,689 B2 | 2/2003 | Yerganian | |
| 2002/0195892 A1* | 12/2002 | Okamoto | H02N 2/163 |
| | | | 310/81 |
| 2009/0134744 A1 | 5/2009 | Yoon et al. | |

* cited by examiner

PIEZOELECTRIC ULTRASONIC MOTOR AND OPERATION METHOD OF THE SAME

CROSS-REFERENCE TO RELATED APPLICATION(S) AND CLAIM OF PRIORITY

The present application is related to and claims the benefit of Korean Patent Application No. 10-2015-0068186, filed on May 15, 2015, in the Korean Intellectual Property Office, the disclosure of which is incorporated herein in its entirety by reference.

TECHNICAL FIELD

The present disclosure relates to a piezoelectric ultrasonic motor and an operation method of the same.

BACKGROUND

A piezoelectric ultrasound motor performs a function of a rotating motor as piezoelectric ceramics, which produce simple vibrations such as contraction or expansion when electrical power is applied thereto, perform circular or linear motions by friction between a stator and a rotor (or a mover). Compared to an electromagnetic motor, the piezoelectric ultrasound motor has a piezoelectric material having a high energy density, a high response speed, high positional precision, and an off-power holding function and uses vibration in an ultrasonic frequency band. Thus, the piezoelectric ultrasound motor generates relatively less noise during operation.

Also, the piezoelectric ultrasound motor does not generate electromagnetic waves or is not affected by the electromagnetic waves because the piezoelectric ultrasound motor does not use coils or any magnetic material. In addition, by using the piezoelectric ultrasonic motor, precise position control may be conducted, and due to the compact size of the piezoelectric ultrasonic motor, the piezoelectric ultrasonic motor may be easily applied to systems such as precision machines. The piezoelectric ultrasonic motor is used in fields such as robotics, medical equipment, cameras, semiconductor testing equipment, building automation equipment, etc., which use super-precision position control.

An existing piezoelectric ultrasonic motor does not include a separate vibration damping device, and thus, requires a certain period of time for natural damping of residual vibration of a traveling-wave after power off.

SUMMARY

To address the above-discussed deficiencies, it is a primary object to provide, a piezoelectric ultrasonic motor, which is capable of controlling an amplitude size of vibration generated by a traveling-wave and more efficiently damping the vibration generated by the traveling-wave.

Additional aspects will be set forth in part in the description which follows and, in part, will be apparent from the description, or may be learned by practice of the presented embodiments.

According to an aspect of an embodiment, a piezoelectric ultrasonic motor includes a drive piezoelectric material wherein a plurality of piezoelectric elements, which are polarized by opposite polarities along a circumferential direction around a rotation shaft, are alternately arranged, and a vibration-control piezoelectric material wherein a plurality of piezoelectric elements, which are arranged along a circumferential direction around the rotation shaft and polarized by opposite polarities, are arranged to correspond to the plurality of piezoelectric elements of the drive piezoelectric material, wherein AC power and another AC power comprising a phase difference with respect to the AC power are respectively applied to the piezoelectric material and the vibration-control piezoelectric material, in a vibration damping area of the drive piezoelectric material.

The drive piezoelectric material may be arranged inside the vibration-control piezoelectric material, based on the rotation shaft.

The drive piezoelectric material may be arranged outside the vibration-control piezoelectric material, based on the rotation shaft.

The piezoelectric ultrasonic motor may further include a vibrator configured to contact the drive piezoelectric material and the vibration-control piezoelectric material and configured to receive vibration of the drive piezoelectric material and the vibration-control piezoelectric material.

The vibrator may be configured with a hollow form.

The piezoelectric ultrasonic motor may further include a rotor configured to rotate by a frictional force that is generated by contacting the vibrator and friction between the vibrator and the rotor.

The vibrator may be configured with a hollow form.

The phase difference may be 45 to 315 degrees.

The AC power, wherein a level of voltage is gradually reduced, may be applied to the drive piezoelectric material.

According to an aspect of another embodiment, a piezoelectric ultrasonic motor includes a drive piezoelectric material wherein a plurality of piezoelectric elements, which are polarized by opposite polarities along a circumferential direction around a rotation shaft, are alternately arranged, and a vibration-control piezoelectric material wherein a plurality of piezoelectric elements, which are arranged along a circumferential direction around the rotation shaft and polarized by opposite polarities, are arranged to correspond to the plurality of piezoelectric elements of the drive piezoelectric material, wherein AC powers of a same phase are respectively applied to the drive piezoelectric material and the vibration-control piezoelectric material, in a vibration area of the drive piezoelectric material.

The AC power may be applied to the drive piezoelectric material and may not be applied to the vibration-control piezoelectric material, in the vibration area of the drive piezoelectric material.

The piezoelectric ultrasonic motor may further include a vibrator configured to contact the drive piezoelectric material and the vibration-control piezoelectric material and configured to receive vibration of the drive piezoelectric material and the vibration-control piezoelectric material.

The vibrator may be configured with a hollow form.

The piezoelectric ultrasonic motor may further include a rotor configured to rotate by a frictional force that is generated by contacting the vibrator and friction the vibrator and the rotor.

The vibrator may be configured with a hollow form.

An operation method of the piezoelectric ultrasonic motor may include inputting a signal restricting a driving force of the piezoelectric ultrasonic motor, applying AC power, wherein a level of voltage is gradually reduced, to the drive piezoelectric material, and applying another AC power comprising a phase difference with respect to the AC power to the vibration-control piezoelectric material.

The phase difference may be 45 to 315 degrees.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

The present disclosure will now be described more fully with reference to the accompanying drawings, in which embodiments of the present disclosure are shown. In the drawings, like reference numerals in the drawings denote like elements, and the thicknesses of layers and regions are exaggerated for clarity. The present disclosure may be embodied in many different forms and should not be construed as being limited to the embodiments set forth herein.

When an element is referred to as being "on" or "above" another element, it may be directly on the other element, or intervening elements may also be present.

It will be understood that, although the terms first, second, etc. may be used herein to describe various elements, these elements should not be limited by these terms. These terms are only used to distinguish one element from another.

As used herein, the singular forms "a", "an", and "the" are intended to include the plural forms as well, unless the context clearly indicates otherwise. In addition, it will be understood that when a unit is referred to as "comprising" another element, it may not exclude other elements but may further include the other elements unless specifically indicated otherwise.

Figure 1:
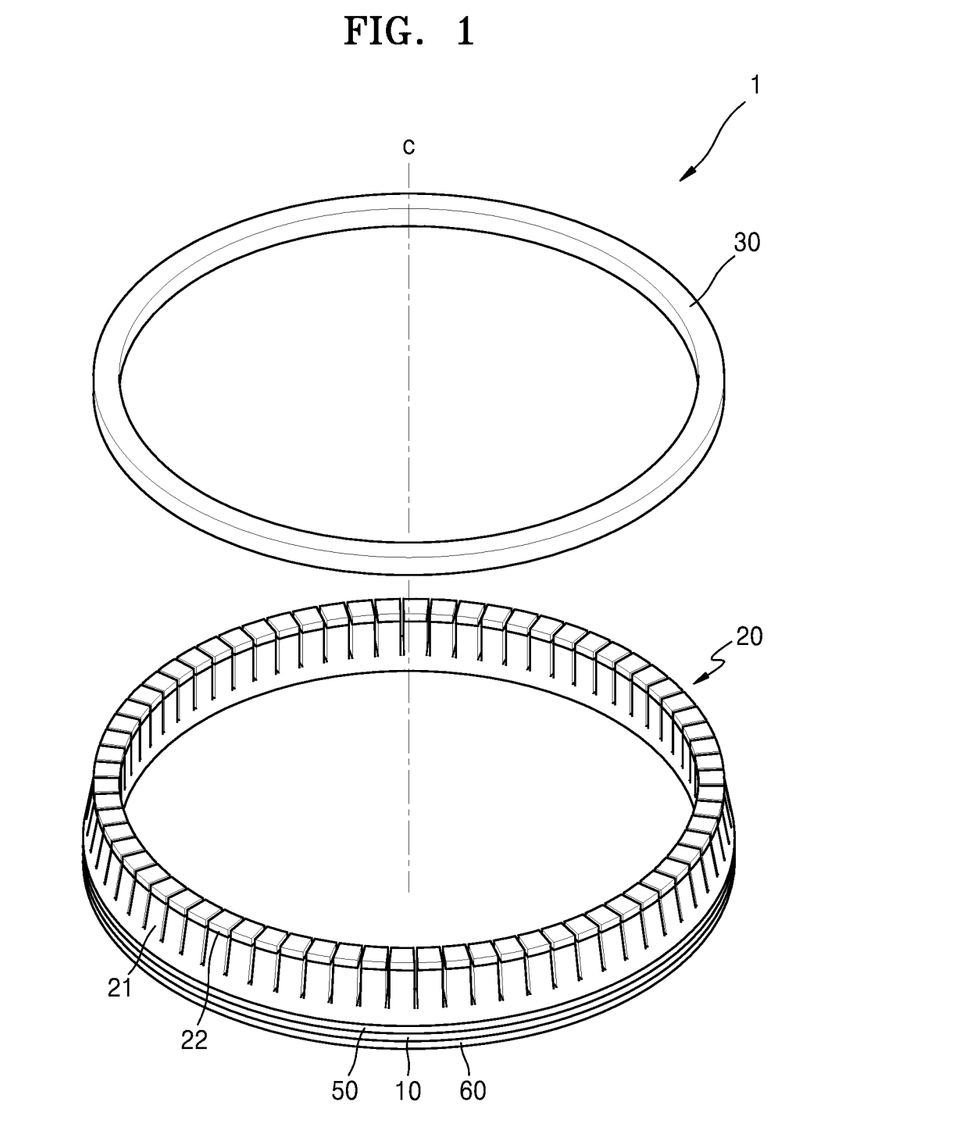
FIG. 1 is a perspective view illustrating a piezoelectric ultrasonic motor according to various embodiments of the present disclosure.
Figure 2:
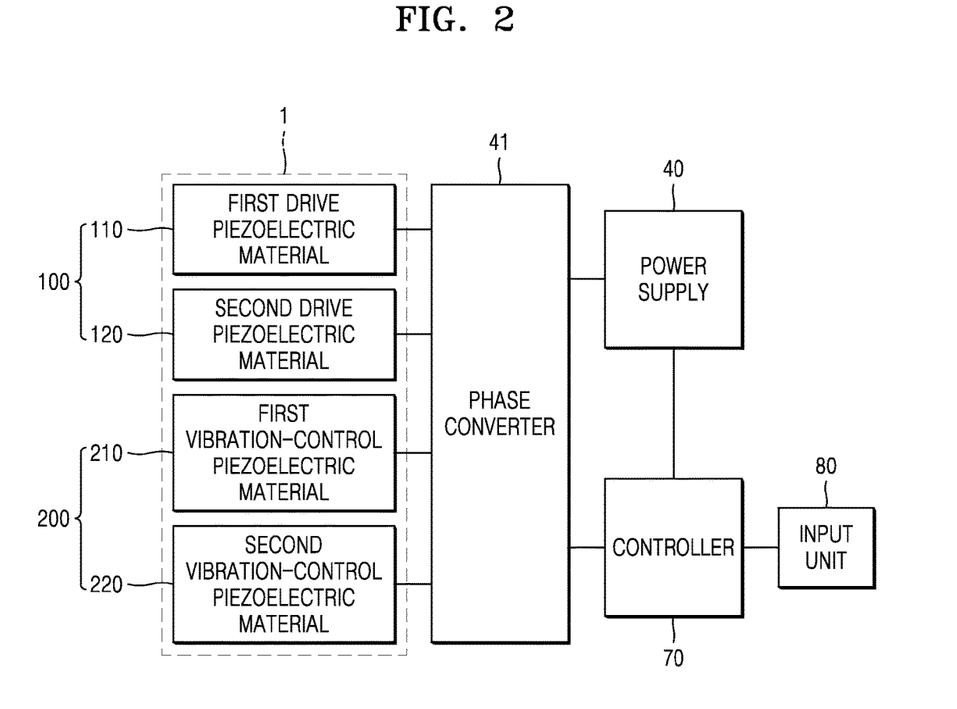
FIG. 2 is a block diagram illustrating a piezoelectric ultrasonic motor and a peripheral circuit according to various embodiments of the present disclosure.

FIG. 1 is a perspective view illustrating a piezoelectric ultrasonic motor 1 according to an embodiment, and FIG. 2 is a block diagram illustrating the piezoelectric ultrasonic motor 1 and a peripheral circuit according to an embodiment.

Referring to FIGS. 1 and 2, the piezoelectric ultrasonic motor 1 may include a piezoelectric material 10, a vibrator 20 attached to the piezoelectric material 10, and a rotor 30 capable of contacting the vibrator 20 and rotating, according to an embodiment. For example, the piezoelectric ultrasonic motor 1 may be formed to have a hollow shape, and the piezoelectric material 10, the vibrator 20, and the rotor 30 may also be formed to have a hollow shape. However, the present disclosure is not limited thereto, and a piezoelectric ultrasonic motor including an output shaft in a center portion may be formed according to purposes of usage of the piezoelectric ultrasonic motor 1.

First and second piezoelectric elements 11 and 12 (described later with reference to FIGS. 4), which are a plurality of devices capable of generating vibration with low voltage by using a piezoelectric effect and are polarized by a positive voltage and a negative voltage, may be alternately arranged in the piezoelectric material 10 along a circumferential direction of a rotation shaft C. Each of the first and second piezoelectric elements 11 and 12 may be formed of a thin, hollow ceramic disk, for example, with a thickness of several tens to several hundreds of microns, and thus, may generate vibration as fine displacement or fine deformation is generated due to the piezoelectric effect even if a low voltage is applied.

Furthermore, the piezoelectric material 10 may include a drive piezoelectric material 100 capable of rotating the rotor 30 by generating vibration, and a vibration-control piezoelectric material 200 capable of damping or increasing the vibration generated in the drive piezoelectric material 100. The drive piezoelectric material 100 and the vibration-control piezoelectric material 200 may be arranged in two rows along a radial direction of the rotation shaft C. For example, the vibration-control piezoelectric material 200 may be arranged inside or outside the drive piezoelectric material 100, and the first and second piezoelectric elements 11 and 12, which are polarized by a positive voltage and a negative voltage, may be alternately arranged in the drive piezoelectric material 100 and the vibration-control piezoelectric material 200 along a circumferential direction of the rotation shaft C.

The vibrator 20 may have a hollow ring shape and may be formed of a metal material having electrical conductivity, for example, steel such as stainless steel, or bronze. The vibrator 20 may be arranged in and adhered to the piezoelectric material 10, which generates a traveling-wave when voltage is applied, by a conductive adhesive (not shown) such as an epoxy including a conductive material. The vibrator 20 may generate vibration by being deformed or displaced by a traveling-wave generated by the piezoelectric material 10, and may transmit the vibration to the rotor 30.

Furthermore, the vibrator 20 may include a plurality of projecting portions 21 which have prescribed gaps therebetween and are arranged in a circumferential direction of the vibrator 20. A wear resistant coating layer 22 may be formed on a contact face of a plurality of projecting portions 21 arranged to face the rotor 30 that will be described at a later time, wherein the contact face is arranged to contact the rotor 30. However, the present disclosure is not limited thereto, and the wear resistant coating layer 22 may cover the entire external surface of the vibrator 20.

The rotor 30 may have a hollow ring shape and may be arranged to contact the vibrator 20, and thus, may rotate around the rotation shaft C due to the vibrator 20 vibrating due to vibration of the piezoelectric material 10. For example, a traveling-wave formed due to vibration of the vibrator 20 may travel along a circumferential direction of the vibrator 20 having a ring shape. The rotor 30 may move in a traveling direction of the traveling-wave by the vibrator 20 due to friction with the vibrator 20, and thus, the rotor 30 may rotate around the rotation shaft C. According to a phase of a driving voltage applied to the piezoelectric material 10, the rotational direction of the rotor 30 may be changed to a clockwise direction or a counter-clockwise direction. The rotor 30 may include a pressing member (not shown) capable of maintaining contact between the rotor 30 and the vibrator 20, for example, the pressing member may be a plate spring.

A power supply 40 may be connected to an applying electrode 50 and a grounding electrode 60, between which the piezoelectric material 10 is interposed, and may supply power to the piezoelectric material 10, that is, first and second drive piezoelectric materials 110 and 120, and first and second vibration-control piezoelectric materials 210 and 220, respectively. For example, the power supply 40 may supply voltage of 400V at a frequency of 60 kHz to the applying electrode 50 and the grounding electrode 60, wherein a phase converter 41 connected to the power supply 40 may convert AC power supplied to the applying electrode 50 and the grounding electrode 60 to another AC power having a prescribed phase difference.

A controller 70 may be connected to the power supply 40 and the phase converter 41 and may control a voltage and a phase of power provided from the power supply 40. The controller 70 may be realized in a type of one microprocessor module, or in a combination type of two or more microprocessor modules. That is, the controller 70 is not limited to a certain type.

An input unit 80 may receive control information about a driving force of the piezoelectric ultrasonic motor 1 and may transmit the information to the controller 70. The input unit 80 may include a button, a key pad, a switch, a dial or a touch interface for inputting the control information about a driving force of the piezoelectric ultrasonic motor 1.

Figure 3:
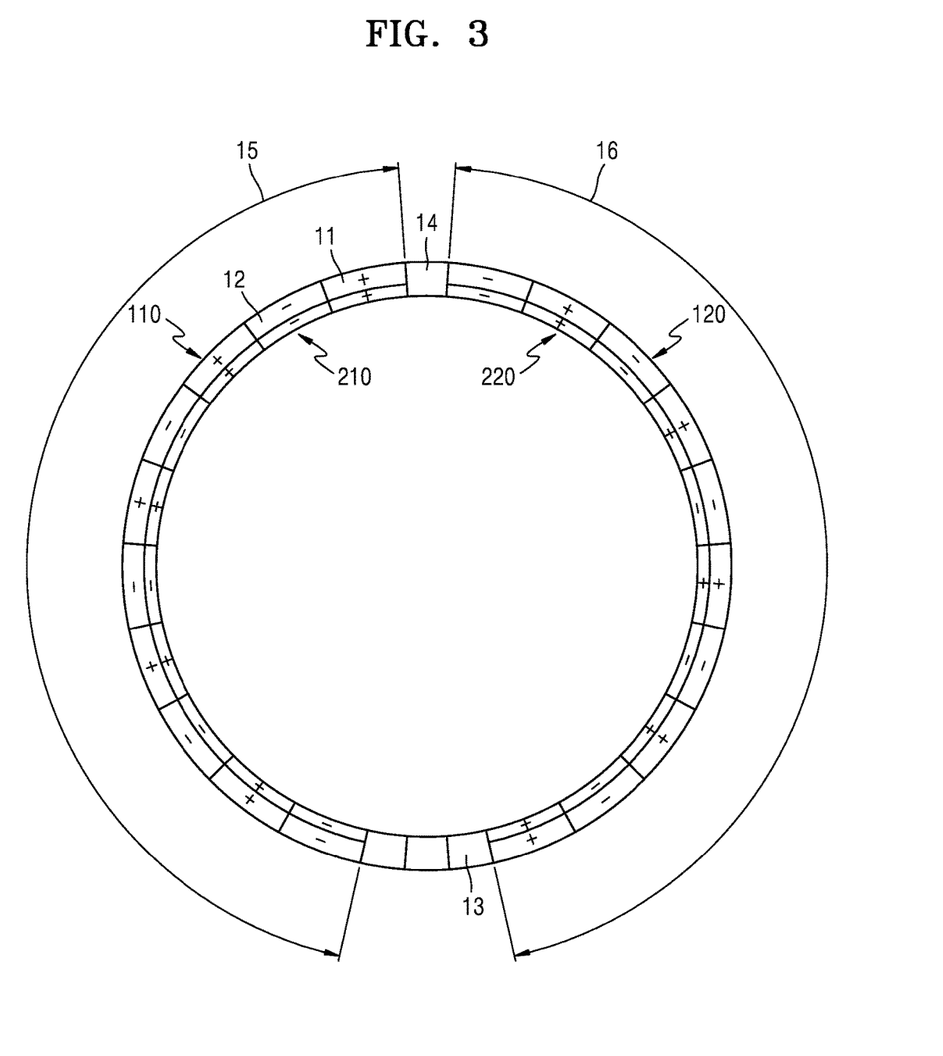
FIGS. 3 and 4 are plan views of a piezoelectric material according to various embodiments of the present disclosure.
Figure 4:
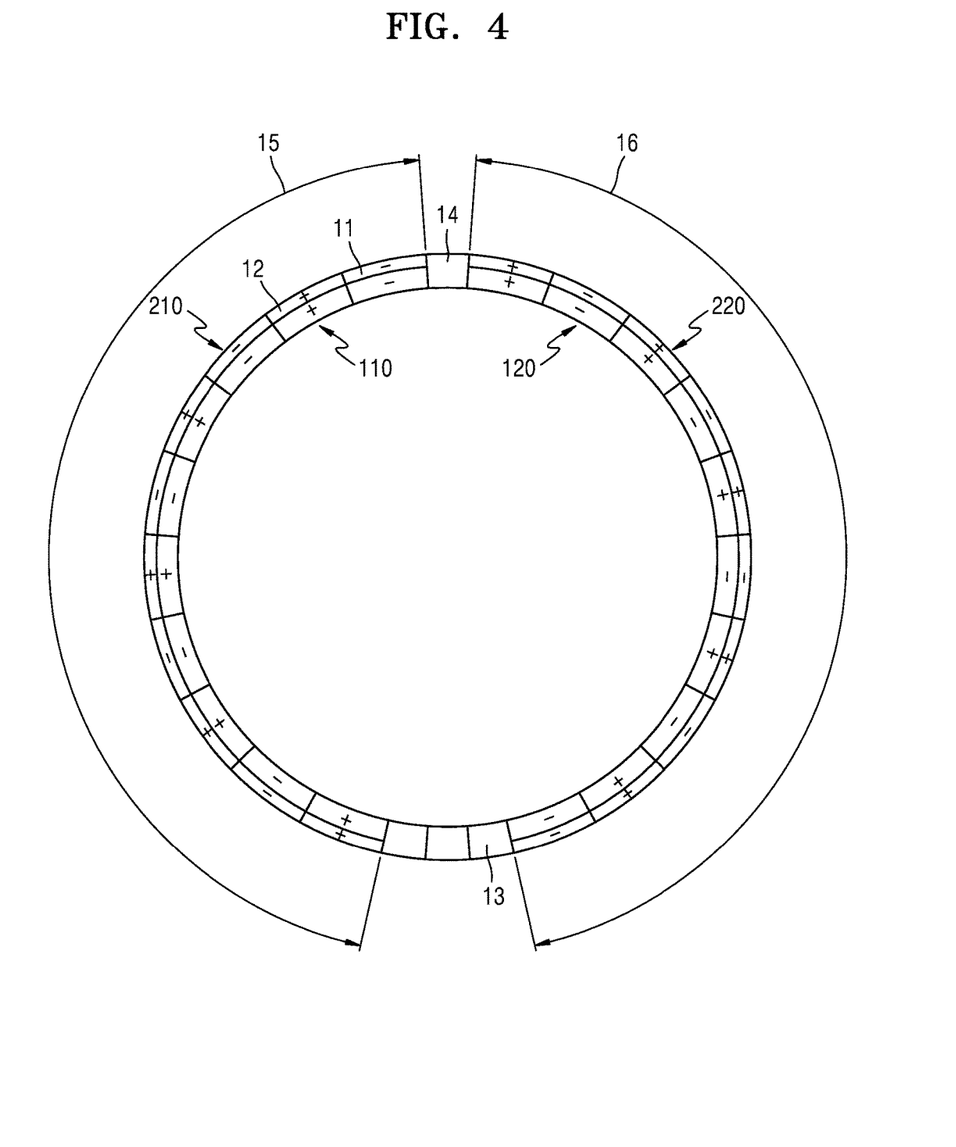
Figure 5:
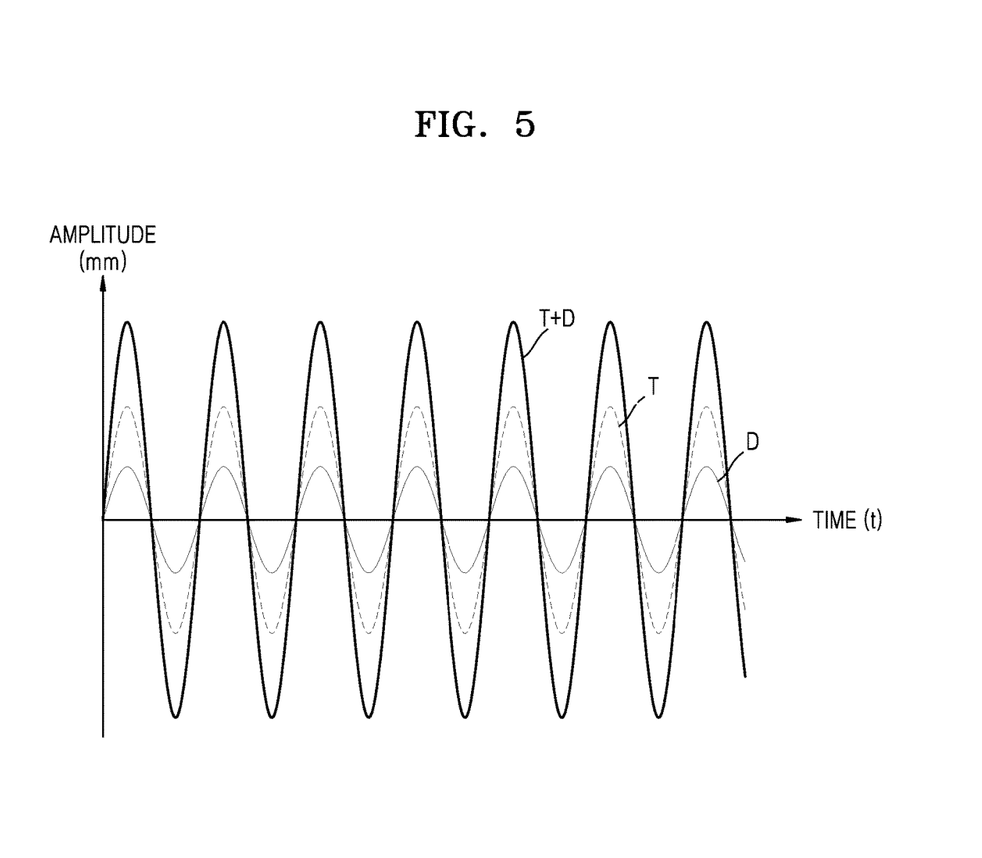
FIGS. 5 to 7 are graphs illustrating vibrations generated in a first piezoelectric material region according to various embodiments of the present disclosure.

FIG. 3 is a plan view of a piezoelectric material 10 according to an embodiment. FIG. 4 is a plan view of a piezoelectric material 10 according to another embodiment. FIG. 5 is a graph illustrating vibration generated in a first piezoelectric material region 15 according to an embodiment.

Referring to FIGS. 3 and 4, the piezoelectric material 10 may include first and second piezoelectric elements 11 and 12 polarized by a positive voltage and a negative voltage, and the first and second piezoelectric elements 11 and 12 may be formed to have a length of ½ wavelength with respect to an intended travelling wave. Furthermore, the piezoelectric material 10 may include first and second dummy portions 13 and 14, in which the first and second piezoelectric elements 11 and 12 are not arranged.

The first dummy portion 13 may be formed to have a length of ¾ wavelength with respect to an intended travelling wave and may not be polarized by a positive voltage or a negative voltage. The second dummy portion 14 may be formed to have a length of ¼ wavelength with respect to an intended travelling wave, and may be arranged to face the first dummy portion 13. The second dummy portion 14 may also not be polarized by a positive voltage or a negative voltage. As lengths of the first and second dummy portions 13 and 14 are different from each other, vibration of the first and second piezoelectric elements 11 and 12 may interfere with each other, and a traveling-wave may be formed.

The first piezoelectric material region 15 and a second piezoelectric material region 16 may be divided based on the first and second dummy portions 13 and 14. For example, the first piezoelectric material region 15 may include a first drive piezoelectric material 110 and a first vibration-control piezoelectric material 210, and the second piezoelectric material region 16 may include a second drive piezoelectric material 120 and a second vibration-control piezoelectric material 220. The first and second drive piezoelectric materials 110 and 120 may be arranged inside or outside the first and second vibration-control piezoelectric materials 210 and 220 based on a rotation shaft C.

When the piezoelectric ultrasonic motor 1 generates a driving force, for example, in a vibration area of the drive piezoelectric material 100, AC power of a sine wave having a phase difference of 90 degrees may be applied to each of the first drive piezoelectric material 110 and the first vibration-control piezoelectric material 210 in the first piezoelectric material region 15, and the second drive piezoelectric material 120 and the second vibration-control piezoelectric material 220 in the second piezoelectric material region 16.

For example, AC power of $A \sin wt$ may be applied to the first drive piezoelectric material 110 in the first piezoelectric material region 15, AC power of $A \cos wt$ may be applied to the second drive piezoelectric material 120 in the second piezoelectric material region 16, AC power of $A' \sin wt$ may be applied to the first vibration-control piezoelectric material 210 in the first piezoelectric material region 15, and AC power of $A' \cos wt$ may be applied to the second vibration-control piezoelectric material 220 in the second piezoelectric material region 16. In other words, AC power of $A \sin wt$ and $A' \sin wt$ of the same phase may be respectively applied to the first drive piezoelectric material 110 and the first vibration-control piezoelectric material 210 in the first piezoelectric material region 15, and AC power of $A \cos wt$ and $A' \cos wt$ of the same phase may be respectively applied to the second drive piezoelectric material 120 and the second vibration-control piezoelectric material 220 in the second piezoelectric material region 16, and therefore, vibration may be generated a plurality times in the first and second piezoelectric material regions 15 and 16.

Since a method of applying a plurality of AC powers of a same phase to the first and second piezoelectric material regions 15 and 16 and generating vibration a plurality times is substantially same, for convenience of description, a method of generating vibration a plurality times around the first drive piezoelectric material 110 and the first vibration-control piezoelectric material 210 in the first piezoelectric material region 15 will be described in detail below.

For example, referring to FIGS. 3 and 5, when AC power of $A \sin wt$ and $A' \sin wt$ of the same phase is applied to the first drive piezoelectric material 110 and the first vibration-control piezoelectric material 210, respectively, first vibration T and second vibration D of the same phase and having a prescribed amplitude may be generated by the first drive piezoelectric material 110 and the first vibration-control piezoelectric material 210.

In a case of generating vibration having a relatively great amplitude in the piezoelectric material 10 according to purposes of usage of the piezoelectric ultrasonic motor 1, AC power of A sin wt and A' sin wt of the same phase may be respectively applied to the first drive piezoelectric material 110 and the first vibration-control piezoelectric material 210, and thus, third vibration (T+D), in which the first vibration T and the second vibration D are added, having a greater amplitude may be generated.

However, the present disclosure is not limited thereto. For example, in a case of generating vibration having a relatively small amplitude in the piezoelectric material 10 according to purposes of usage of the piezoelectric ultrasonic motor 1, AC power of A sin wt may be applied only to the first drive piezoelectric material 110 or AC power of A' sin wt may be applied only to the first vibration-control piezoelectric material 210, and thus, the first vibration T and the second vibration D having a prescribed amplitude may be generated in the piezoelectric material 10.

Therefore, in order to control an amplitude of vibration generated in the piezoelectric material 10, which is generated as expansion and shrinkage degrees of the piezoelectric ultrasonic motor 1 change due to a use environment, for example, a high temperature or a low temperature environment, AC power of same phase may be respectively applied to the first vibration-control piezoelectric material 210 and first drive piezoelectric material 110, and the second vibration-control piezoelectric material 220 and the second drive piezoelectric material 120. Therefore, the piezoelectric ultrasonic motor 1 may be used in various use environments.

Figure 6:
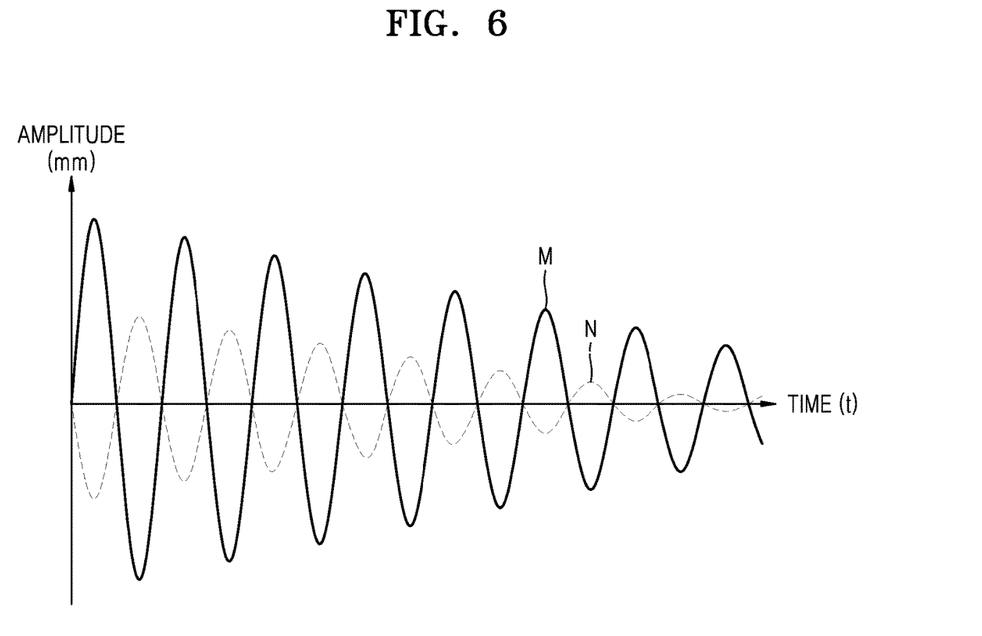
Figure 7:
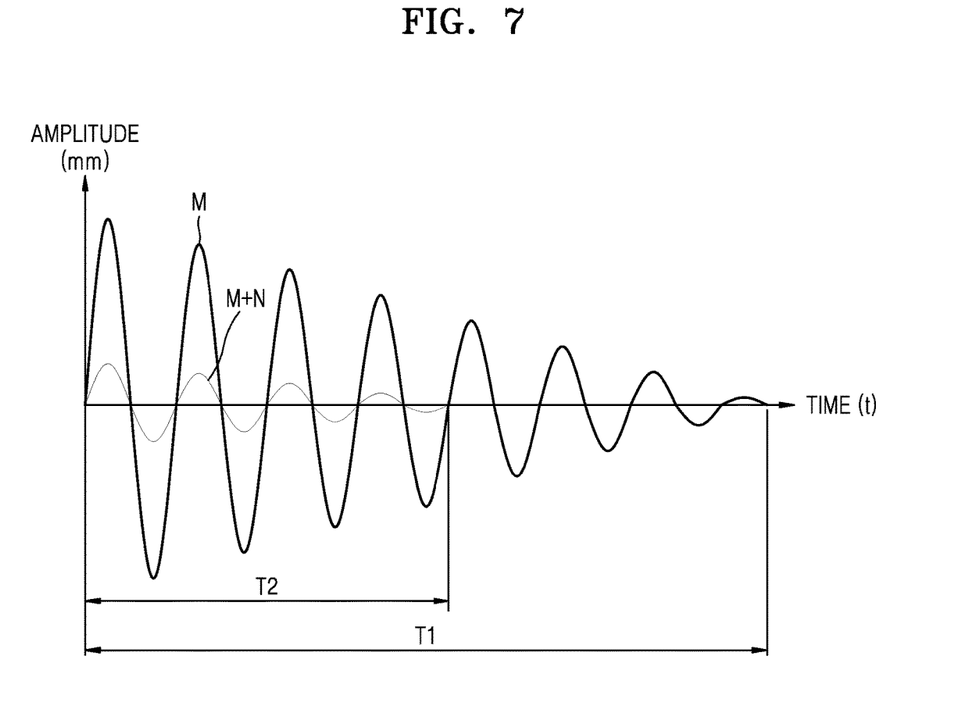

FIGS. 6 and 7 are graphs illustrating vibration generated in the first piezoelectric material region 15 according to an embodiment.

In order to quickly dampen vibration, which is generated from the drive piezoelectric material 100, as a faster response corresponding to a control of a driving force of the piezoelectric ultrasonic motor 1 is required, AC power of a sine wave having a prescribed phase difference may be applied to each of the first drive piezoelectric material 110 and the first vibration-control piezoelectric material 210 in the first piezoelectric material region 15, and the second drive piezoelectric material 120 and the second vibration-control piezoelectric material 220 in the second piezoelectric material region 16, in a vibration damping area of the drive piezoelectric material 100.

For example, AC power of $Ae^{-\lambda t} \sin wt$, in which a level of voltage is gradually reduced, may be applied to the first drive piezoelectric material 110 in the first piezoelectric material region 15, AC power of $Ae^{-\lambda t} \cos wt$, in which a level of voltage is gradually reduced, may be applied to the second drive piezoelectric material 120 in the second piezoelectric material region 16, AC power of $A'^{-\lambda t} \sin (wt+\Phi)$ may be applied to the first vibration-control piezoelectric material 210 in the first piezoelectric material region 15, and AC power of $A'^{-\lambda t} \cos (wt+\Phi)$ may be applied to the second vibration-control piezoelectric material 220 in the second piezoelectric material region 16. In other words, AC power of $Ae^{-\lambda t} \sin wt$ and $A'^{-\lambda t} \sin (wt+\Phi)$ of different phases may be respectively applied to the first drive piezoelectric material 110 and the first vibration-control piezoelectric material 210 in the first piezoelectric material region 15, and AC power of $Ae^{-\lambda t} \cos wt$ and $A'^{-\lambda t} \cos (wt+\Phi)$ of different phases may be respectively applied to the second drive piezoelectric material 120 and the second vibration-control piezoelectric material 220 in the second piezoelectric material region 16, and therefore, vibration may be generated a plurality times in the first and second piezoelectric material regions 15 and 16. A phase difference ($\Phi$) of the AC power applied to the first and second drive piezoelectric materials 110 and 120 or the second drive piezoelectric material 120 and the second vibration-control piezoelectric material 220 may be 45 to 315 degrees.

Since a method of applying a plurality of AC powers for generating vibration of different phases a plurality times to the first and second piezoelectric material regions 15 and 16 and generating vibration a plurality times is substantially the same as the above, for convenience of description, a method of generating vibration a plurality times around the first drive piezoelectric material 110 and the first vibration-control piezoelectric material 210 in the first piezoelectric material region 15 will be described in detail below.

For example, referring to FIGS. 3, 6 and 7, when AC power of $Ae-80\ t \sin wt$, in which a level of voltage is gradually reduced, and AC power of $A'-\lambda t \sin (wt+\pi)$ having a phase difference of 180 degrees corresponding to AC power applied to the first drive piezoelectric material 110 are respectively applied to the first drive piezoelectric material 110, fourth vibration M and fifth vibration N of different phases and having a prescribed amplitude may be generated by the first drive piezoelectric material 110 and the first vibration-control piezoelectric material 210.

When vibration generated from the first drive piezoelectric material 110 is stopped by an external force to block a driving force of the piezoelectric ultrasonic motor 1, an impact may be applied to the piezoelectric ultrasonic motor 1. In a case of damping vibration generated in the first drive piezoelectric material 110 to a level of the fourth vibration M by gradually reducing voltage of AC power applied to the first drive piezoelectric material 110 in order to reduce the impact applied to the piezoelectric ultrasonic motor 1, a time taken for damping vibration of the piezoelectric ultrasonic motor 1 may be a first damping control time $T_1$.

Meanwhile, in order to quickly damp vibration, which is generated from the first drive piezoelectric material 110, as a faster response corresponding to a control signal for blocking a driving force of the piezoelectric ultrasonic motor 1 is required, AC power of $A'-\lambda t \sin (wt+\pi)$ having a phase difference of 180 degrees corresponding to AC power of $Ae-\lambda t \sin wt$ applied to the first drive piezoelectric material 110 may be applied to the first vibration-control piezoelectric material 210, and thus, sixth vibration (M+N), in which the fourth vibration M and the fifth vibration N are added, may be generated. Here, a time taken for damping vibration of the piezoelectric ultrasonic motor 1 may be a second damping control time T2, and the second damping control time T2 may be shorter than the first damping control time T1.

Therefore, when a faster response corresponding to a control signal for blocking a driving force of the piezoelectric ultrasonic motor 1 is required, a control time for vibration damping of the drive piezoelectric material 100 may be reduced by applying AC power having a prescribed phase difference corresponding to AC power applied to the first and second drive piezoelectric materials 110 and 120 to the first and second vibration-control piezoelectric materials 210 and 220. Therefore, it is possible to rapidly block a driving force of the piezoelectric ultrasonic motor 1 by responding more quickly to a control signal corresponding to the piezoelectric ultrasonic motor 1, and it is possible to reduce an impact to the piezoelectric ultrasonic motor 1.

Figure 8:
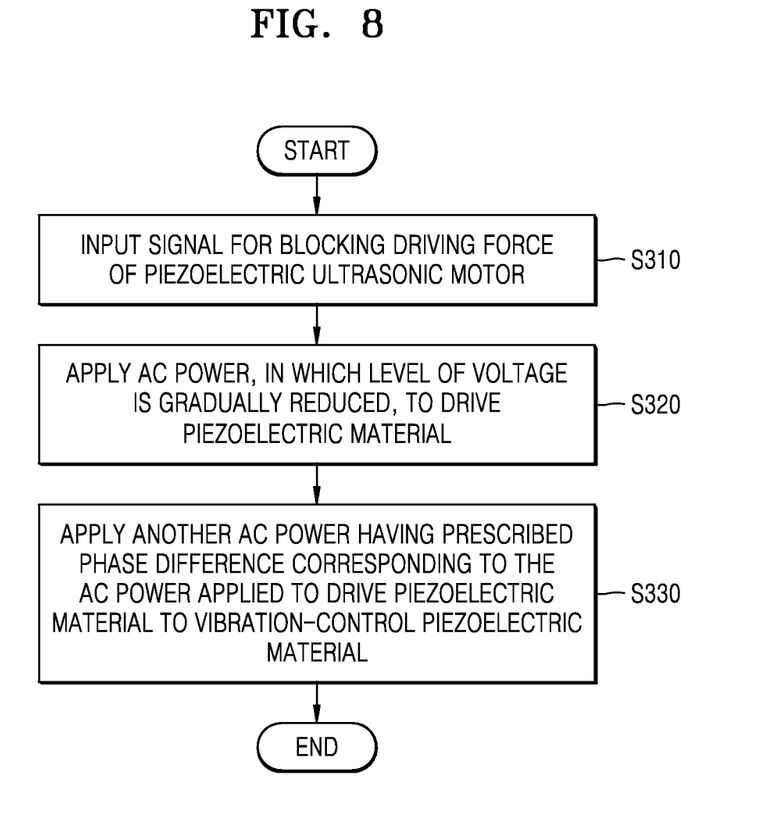
FIG. 8 is a flowchart of an operation method of a piezoelectric ultrasonic motor according to various embodiments of the present disclosure.

FIG. 8 is a flowchart of an operation method of the piezoelectric ultrasonic motor 1 according to an embodiment.

Referring to FIGS. 2 and 8, in operation 310, a signal for blocking a driving force of the piezoelectric ultrasonic motor 1 is input to the input unit 80.

An input signal blocking a driving force of the piezoelectric ultrasonic motor 1 may be received from the input unit 80 in the controller 70.

In operation 320, AC power, in which a level of voltage is gradually reduced, is applied to the drive piezoelectric material 100.

When vibration generated from the first and second drive piezoelectric materials 110 and 120 arranged in the first and second piezoelectric material regions 15 and 16 is damped, a driving force of the piezoelectric ultrasonic motor 1 may be restricted. Accordingly, the controller 70, in order to restrict the driving force of the piezoelectric ultrasonic motor 1, may transmit a control signal to the power supply 40 so that AC power, in which a level of voltage is gradually reduced, may be applied to the first drive piezoelectric material 110 provided in the first piezoelectric material region 15 and the second drive piezoelectric material 120 provided in the second piezoelectric material region 16.

In operation 330, AC power having a prescribed phase difference corresponding to AC power applied to the drive piezoelectric material 100 is applied to the vibration-control piezoelectric material 200.

If faster damping of vibration is required, in which the vibration is generated from the first and second drive piezoelectric materials 110 and 120 arranged in the first and second piezoelectric material regions 15 and 16, AC power having a prescribed phase difference, for example, a phase difference of 45 to 315 degrees may be respectively applied to the first drive piezoelectric material 110 and the first vibration-control piezoelectric material 210, and the second drive piezoelectric material 120 and the second vibration-control piezoelectric material 220, and thus, the vibration generated from the first and second drive piezoelectric materials 110 and 120 may be damped faster than when AC power, in which a level of voltage is gradually reduced, is applied to the first and second drive piezoelectric materials 110 and 120.

It should be understood that embodiments described herein should be considered in a descriptive sense only and not for purposes of limitation. Descriptions of features or aspects within each embodiment should typically be considered as available for other similar features or aspects in other embodiments.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A piezoelectric ultrasonic motor comprising:
    a drive piezoelectric material, wherein a first plurality of piezoelectric elements, which are polarized by opposite polarities along a circumferential direction around a rotation shaft, are alternately arranged; and
    a vibration-control piezoelectric material, wherein a second plurality of piezoelectric elements, which are arranged along the circumferential direction around the rotation shaft and polarized by the opposite polarities, are arranged to correspond to the first plurality of piezoelectric elements of the drive piezoelectric material,
    wherein an alternating current (AC) power and another AC power comprising a phase difference with respect to the AC power are respectively applied to the drive piezoelectric material and the vibration-control piezoelectric material, in a vibration damping area of the drive piezoelectric material.

2. The piezoelectric ultrasonic motor of claim 1, wherein the drive piezoelectric material is arranged inside the vibration-control piezoelectric material based on the rotation shaft.

3. The piezoelectric ultrasonic motor of claim 1, wherein the drive piezoelectric material is arranged outside the vibration-control piezoelectric material based on the rotation shaft.

4. The piezoelectric ultrasonic motor of claim 1, further comprising a vibrator configured to contact the drive piezoelectric material and the vibration-control piezoelectric material and configured to receive vibration of the drive piezoelectric material and the vibration-control piezoelectric material.

5. The piezoelectric ultrasonic motor of claim 4, wherein the vibrator is configured with a hollow form.

6. The piezoelectric ultrasonic motor of claim 4, further comprising a rotor configured to rotate by a frictional force that is generated by contacting the vibrator and friction between the vibrator and the rotor.

7. The piezoelectric ultrasonic motor of claim 6, wherein the vibrator is configured with a hollow form.

8. The piezoelectric ultrasonic motor of claim 1, wherein the phase difference is 45 degrees to 315 degrees.

9. The piezoelectric ultrasonic motor of claim 1, wherein a level of voltage is gradually reduced as the AC power is applied to the drive piezoelectric material.

10. A piezoelectric ultrasonic motor comprising:
    a drive piezoelectric material, wherein a first plurality of piezoelectric elements, which are polarized by opposite polarities along a circumferential direction around a rotation shaft, are alternately arranged; and
    a vibration-control piezoelectric material, wherein a second plurality of piezoelectric elements, which are arranged along the circumferential direction around the rotation shaft and polarized by opposite polarities, are arranged to correspond to the first plurality of piezoelectric elements of the drive piezoelectric material,
    wherein an alternating current (AC) powers of a same phase are respectively applied to the drive piezoelectric material and the vibration-control piezoelectric material, in a vibration area of the drive piezoelectric material.

11. The piezoelectric ultrasonic motor of claim 10, wherein the AC power is applied to the drive piezoelectric material and is not applied to the vibration-control piezoelectric material, in the vibration area of the drive piezoelectric material.

12. The piezoelectric ultrasonic motor of claim 10, further comprising a vibrator configured to contact the drive piezoelectric material and the vibration-control piezoelectric material and configured to receive vibration of the drive piezoelectric material and the vibration-control piezoelectric material.

13. The piezoelectric ultrasonic motor of claim 12, wherein the vibrator is configured with a hollow form.

14. The piezoelectric ultrasonic motor of claim 12, further comprising a rotor configured to rotate by a frictional force that is generated by contacting the vibrator and a friction between the vibrator and the rotor.

15. The piezoelectric ultrasonic motor of claim 14, wherein the vibrator is configured with a hollow form.

16. A method for operating a piezoelectric ultrasonic motor comprising:
inputting a signal restricting a driving force of the piezoelectric ultrasonic motor;
applying an alternating current (AC) power, wherein a level of a voltage is gradually reduced, to a drive piezoelectric material; and
applying another AC power comprising a phase difference with respect to the AC power to a vibration-control piezoelectric material.

17. The method of claim 16, wherein the phase difference is 45 degrees to 315 degrees.

* * * * *